United States Patent
Bang

[19]

[11] Patent Number: 6,088,143
[45] Date of Patent: Jul. 11, 2000

[54] REMOTE INFRARED PASSWORD KEY SYSTEM AND METHODS FOR CONTROLLING THE SAME

[75] Inventor: Il-Soon Bang, Suwon, Rep. of Korea

[73] Assignee: SamSung Electronics Co., Ltd., Suwon, Rep. of Korea

[21] Appl. No.: 09/012,691

[22] Filed: Jan. 23, 1998

[30] Foreign Application Priority Data

Mar. 10, 1997 [KR] Rep. of Korea .................. 97/7961

[51] Int. Cl.$^7$ ............................................. H04B 10/00
[52] U.S. Cl. ..................... 359/147; 359/142; 359/148; 340/825.31
[58] Field of Search .................. 359/142, 148; 340/825.31; 379/357

[56] References Cited

U.S. PATENT DOCUMENTS

| | | | |
|---|---|---|---|
| 4,850,046 | 7/1989 | Philippe | 455/608 |
| 5,081,628 | 1/1992 | Maekawa et al. | 371/34 |
| 5,109,222 | 4/1992 | Welty | 340/825.72 |
| 5,189,543 | 2/1993 | Lin et al. | 359/142 |
| 5,252,960 | 10/1993 | Duhame | 340/825.56 |
| 5,255,313 | 10/1993 | Darbee | 379/102 |
| 5,267,299 | 11/1993 | Nomura | 379/88 |
| 5,349,459 | 9/1994 | Reed | 359/142 |
| 5,414,761 | 5/1995 | Darbee | 379/102 |
| 5,436,853 | 7/1995 | Shimohara | 364/569 |
| 5,576,701 | 11/1996 | Heitschel et al. | 340/825.31 |
| 5,598,290 | 1/1997 | Tanaka et al. | 359/180 |
| 5,633,914 | 5/1997 | Rosa | 379/59 |
| 5,654,813 | 8/1997 | Whitworth | 359/147 |
| 5,689,353 | 11/1997 | Darbee et al. | 359/148 |

*Primary Examiner*—Leslie Pascal
*Assistant Examiner*—Vu Lieu
*Attorney, Agent, or Firm*—Robert E. Bushnell, Esq.

[57] ABSTRACT

A remote infrared password key system teaches entering a password with a remote control, conveniently entering a password by pressing one key utilizing a password hot key which also eliminates the need to store the password, and preventing unwanted disclosure of the password, by using a remote infrared password key system. The remote infrared password key system uses a switch for selecting a direct transfer mode or a password input mode and sending out a mode signal; a controller for receiving the mode signal from the switch and sending out a mode change signal; a key selector for entering a password and outputting a password signal; a password signal director for receiving the mode change signal and the password signal and directing the password signal for direct transmittal if the direct transfer mode has been selected by the switch or for indirect transmittal if the password input mode has been selected by the switch; a memory for storing the password signal outputted by the password signal director for indirect transmittal when the password input mode has been selected; a password hot key for outputting the password signal stored in the memory for transmittal; and a transmitter for receiving the password signal outputted by the password hot key is or the password signal directed for direct transmittal by the password signal director under the direct transfer mode and then transmitting the received password signal to the computer.

9 Claims, 4 Drawing Sheets

REMOTE INFRARED PASSWORD KEY SYSTEM AND METHODS FOR CONTROLLING THE SAME

CLAIM OF PRIORITY

This application makes reference to, incorporates the same herein, and claims all benefits accruing under 35 U.S.C. §119 from an application for REMOTE INFRARED PASSWORD KEY SYSTEM AND METHODS FOR CONTROLLING THE SAME earlier filed in the Korean Industrial Property Office on the 10$^{th}$ day of March 1997 and there duly assigned Ser. No. 7961/1997.

BACKGROUND OF THE INVENTION

1. Field of the Invention

The present invention relates to a password key system and processed of controlling the same and, more particularly, to a process and system employing a remote infrared password key to simplify the computer password input procedure and to reduce the possibility of unintentional password disclosure to a third party when entering a password.

2. Description of the Related Art

In today's technological society, computers are used universally by everyone and quite often confidential information is stored in the computers. The password system is commonly being used to prevent an unauthorized access to a computer. Under the conventional password system, a password is entered into a computer by using a keyboard when a prompt display appears on the computer screen upon turning on the computer. The user is granted access only if the entered password is identical to the password stored in the computer.

Recent efforts in the art include designs and schemes found, for example, in U.S. Pat. No. 5,598,290 to Tanaka et al., entitled Data Transfer Apparatus Utilizing Infrared Rays, U.S. Pat. No. 5,255,313 to Darbee, entitled Universal Remote Control System, U.S. Pat. No. 5,414,761 to Darbee, entitled Remote Control System, U.S. Pat. No. 5,689,353 to Darbee et al., entitled Remote Control With Two-Way Data Coupling, U.S. Pat. No. 5,267,299 to Nomura, entitled Automatic Answering Telephone Apparatus With Device To Detect A Remote Control Password, U.S. Pat. No. 5,109,222 to Welty, entitled Remote Control System For Control Of Electrically Operable Equipment In People Occupiable Structures, U.S. Pat. No. 5,436,853 to Shimohara, entitled Remote Control Signal processing Circuit For A Microcomputer, U.S. Pat. No. 5,349,459 to Reed, entitled Secure Remote Control System, and U.S. Pat. No. 5,654,813 to Whitworth, entitled Infrared Receiver And System For Controlling A Module.

These techniques are somewhat inconvenient because the user must remember the password. Also, under this method, since the position of the user's fingers are exposed, unintentional disclosure of the password to a third party may result.

Other efforts include designs found in the Lin et al. and Maekawa et al. patents, U.S. Pat. Nos. 5,189,543 and 5,081,628, entitled respectively Infra-Red Wireless Keyboard System and Cordless Keyboard, both propose infrared wireless keyboard system in which cordless signals are provided to the distinguish one wireless keyboard from another by the computer associated therewith.

SUMMARY OF THE INVENTION

A primary object of the present invention is to solve these problems associated with the prior art.

It is another object to provide an improved password key system and process.

It is still another object to provide a password key system and process operating at wavelengths in the infrared spectrum.

It is yet another object to provide a convenient process and apparatus to better secure confidential information stored in the memory of a computer.

It is still yet another object to provide a simplified process and apparatus of controlling access to a computer.

The remote infrared password key system constructed as an embodiment of the present invention, may use a switch for selecting a direct transfer mode or a password input mode and for sending out a mode signal; a controller for receiving the mode signal from the switch and sending out a mode change signal; a key selector for entering a password and outputting a password signal; a password signal director for receiving the mode change signal and the password signal and directing the password signal for direct transmittal if the direct transfer mode has been selected by the switch or for indirect transmittal when the password input mode has been selected by the switch; a memory for storing the password signal outputted by the password signal director for indirect transmittal when the password input mode has been selected; a password hot key for outputting the password signal stored in the memory for transmittal; and a transmitter for receiving the password signal outputted by the password hot key or the password signal directed for direct transmittal by the password signal director under the direct transfer mode and then transmitting the received password signal to the computer.

Another embodiment of the present invention may be practiced by determining whether a password hot key has been entered and outputting the stored password signal for transmittal to the computer if the password hot key has been entered; determining whether a direct transfer mode has been selected if the password hot key has not been entered; directly transmitting a password signal entered by an input means for transmittal to the computer if the direct transfer mode has been selected and the password hot key has not been entered; storing a password signal entered by an input means to the memory if the direct transfer mode has not been selected and the password hot key has not been entered; and transmitting the stored password signal by entering the password hot key for transmittal to the computer.

BRIEF DESCRIPTION OF THE DRAWINGS

A more complete appreciation of the invention, and many of the attendant advantages thereof, will be readily apparent as the same becomes better understood by reference to the following detailed description when considered in conjunction with the accompanying drawings in which like reference symbols indicate the same or similar components, wherein.

DETAILED DESCRIPTION OF THE INVENTION

Figure 1A:
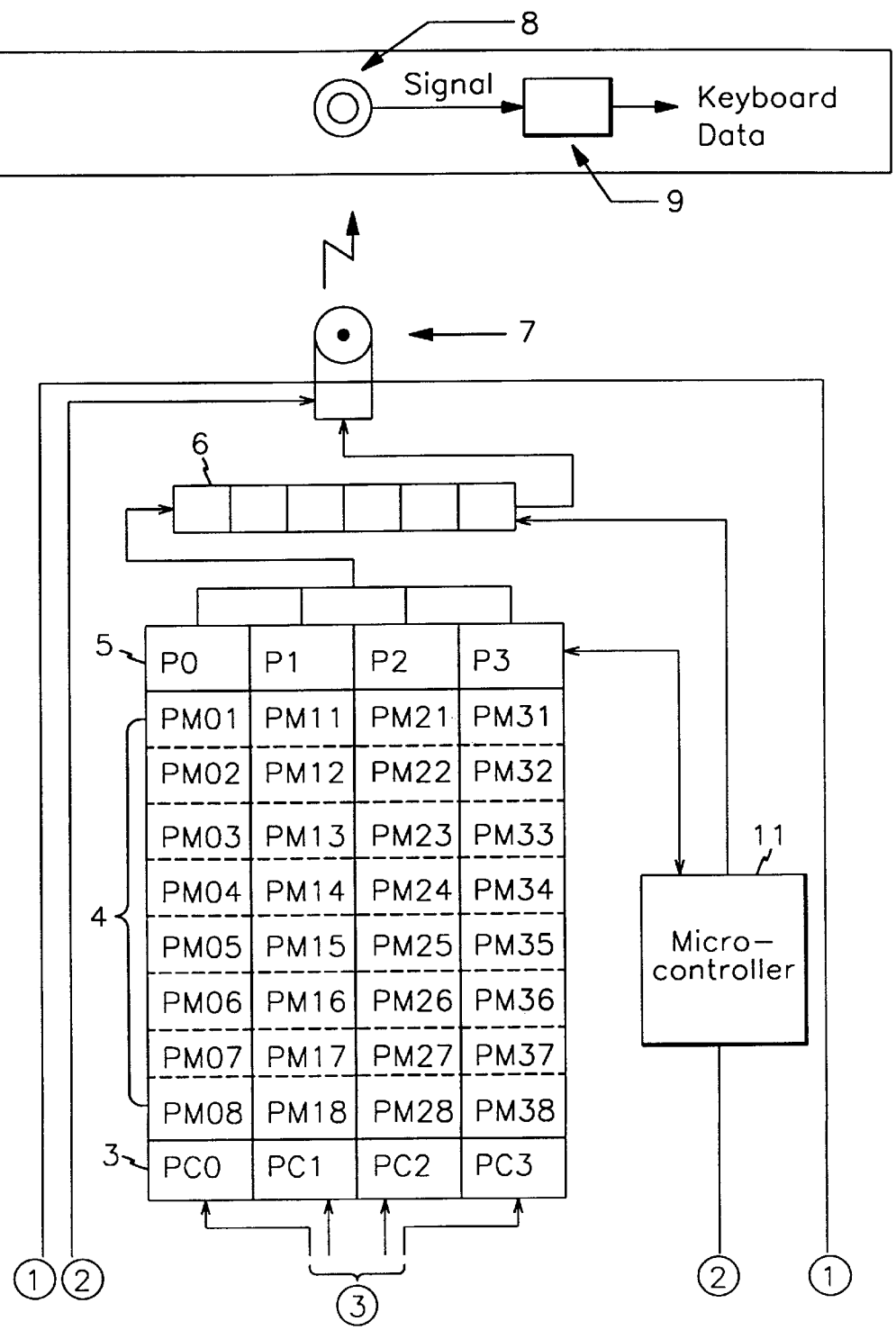
FIGS. 1A–1B together form a schematic diagram of a remote infrared password key system constructed according to the principles of the present invention.
Figure 1B:
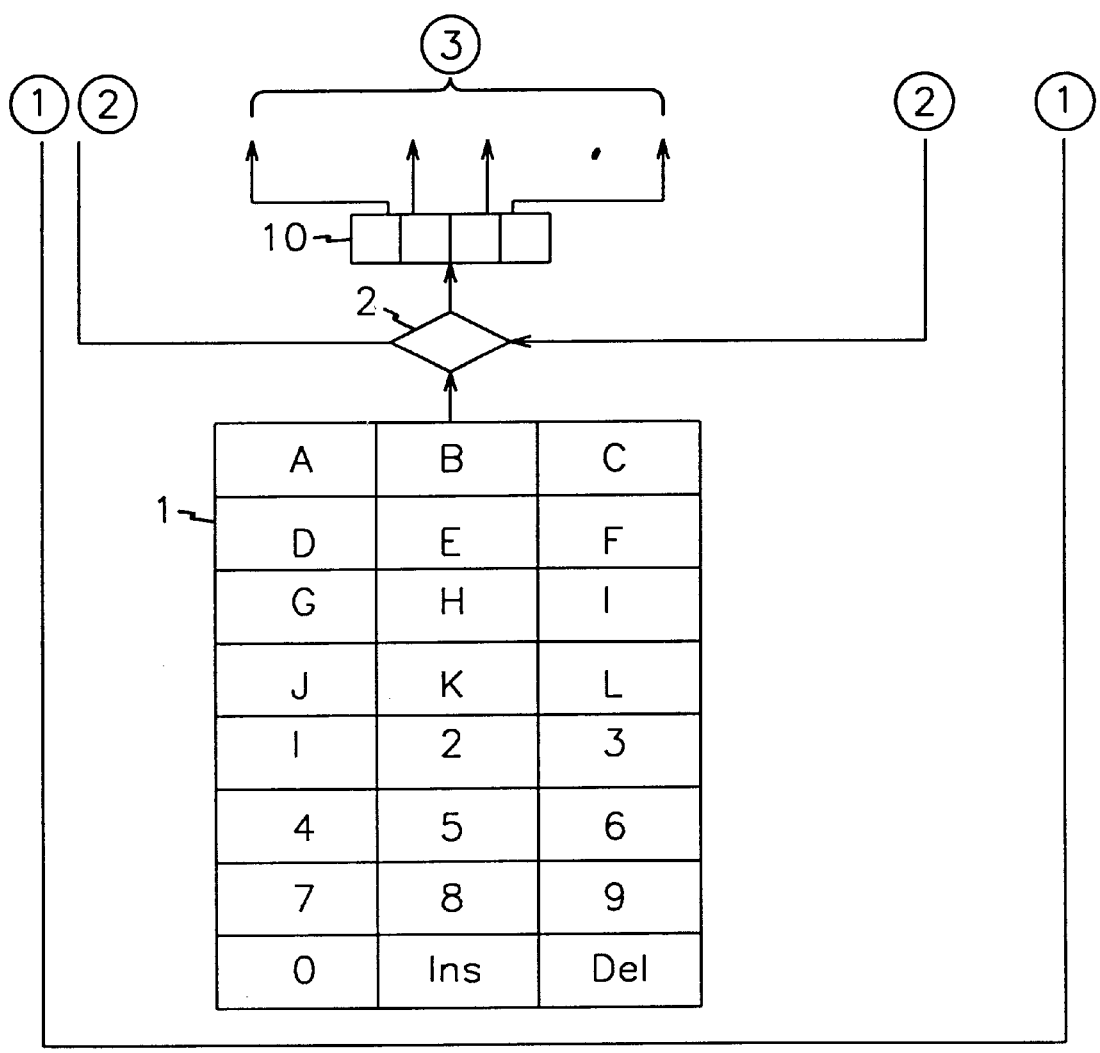

Turning now to the drawings, as is shown in FIGS. 1A–1B, a remote infrared password key system constructed as an embodiment of the present invention, may use a switch (not shown) for selecting direct transfer mode or password input mode and sending out a mode signal; a micro-controller 11 for receiving the mode signal from the switch and sending out a mode change signal; a key matrix 1 having a plurality of letters for entering a password and outputting a password signal; a password signal director 2 for receiving the mode change signal and the password signal and directing the password signal for direct transmittal if the direct transfer mode has been selected by the switch or for indirect transmittal if the password input mode has been selected by the switch; a memory selector 10 for receiving the password signal directed by the password signal director 2 for indirect transmittal and for selecting memory addresses where the password signal may be stored and outputting the password signal; a password counter 3 for receiving the password signal outputted by the memory selector 10 and for counting the number of letters in the password signal and for outputting the password signal; a memory 4 for storing the password signal outputted by the password counter 3; a password hot key 5 for outputting the password signal stored in the memory 4; a password buffer 6 for receiving the password signal outputted by the password hot key 5 and for outputting the password signal according to a control signal of the micro-controller 11; an infrared transmitter 7 for receiving the password signal outputted by the password buffer 6 or the password signal directed for direct transmittal by the password signal director 2 under the direct transfer mode, and for transmitting the received password signal to the computer.

Figure 2:
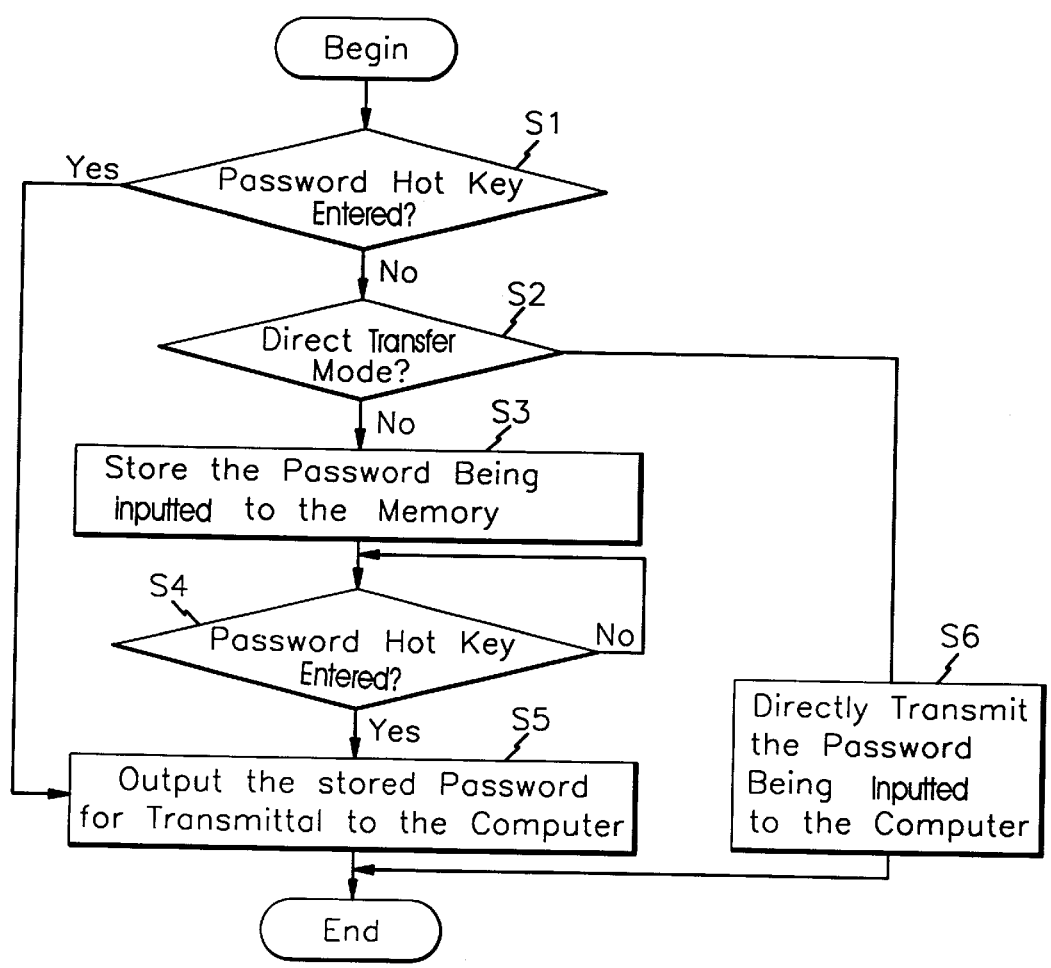
FIG. 2 is a flowchart of a control process for a remote infrared password key system when practiced according to the principles of the present invention.

The above remote infrared password key system works as follows as shown in FIG. 2. When a computer is turned on, the micro-controller 1 determines if the password hot key 5 has been entered (S1). If entered, the password signal stored in a part of the memory 4 corresponding to the hot key entered is outputted for transmittal to the password buffer 6 to the computer (S5).

If the password hot key 5 has not been entered, the micro-controller 11 checks the switch to determine whether the direct transfer mode has been selected (S2). If the direct transfer mode has been selected, the micro-controller 11 sends a direct-transfer control signal to the password signal director 2. A user inputs a password on the key matrix 1 which generates a password signal corresponding to the input and then outputs it. For each letter entered on the key matrix 1, a signal is generated and outputted instantaneously. The password signal director 2 receives the password signal being outputted from the key matrix 1 and directs it to the infrared transmitter 7 according to the direct-transfer control signal from the micro-controller 11. The infrared transmitter 7 transmits the password signal to the computer (S6).

If the password hot key 5 has not been entered and the password input mode has been selected, the micro-controller 11 sends a password-input control signal to the password signal director 2. A user inputs a password on the key matrix 1 which generates a password signal corresponding to the input and outputs the generated password signal when the user enters the insert button (Ins) to indicate that the password input has been completed. The password signal director 2 receives the password signal and sends it to the memory selector 10. The memory selector 10 receives the password signal, and the user selects where the password signal should be stored with the memory selector 10, whereupon the memory selector 10 outputs the password signal. The password counter 3 receives the password signal outputted by the memory selector 10 and counts the number of letters in the password signal and then outputs it to the memory space selected by the user with the memory selector 10 (S3). The password signal is stored in the memory 4 until the password hot key 5 is entered, whereupon it is outputted to the password buffer 6 (S4). The password buffer 6 outputs it to the infrared transmitter 7 which transmits the password signal to the computer (S5).

Figure 3:
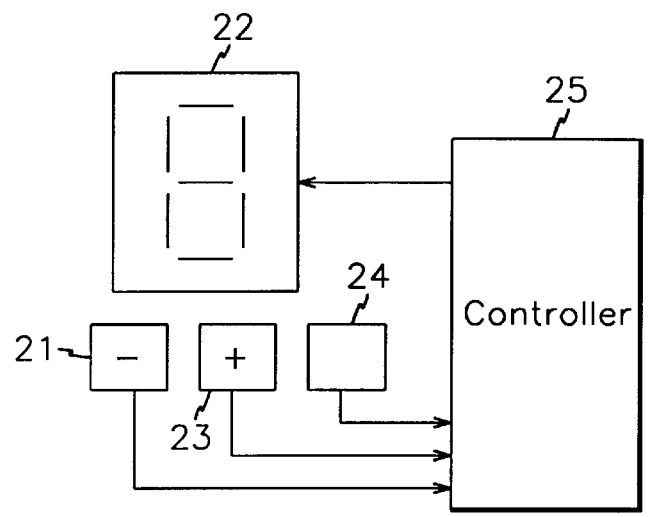
FIG. 3 is a block diagram of a key selector of a remote infrared password key system according to the principles of the present invention.

The memory 4 should preferably have the capacity for storage of four passwords of eight letters. Larger memory space may be used however, to enable storage of more passwords for entering passwords to many computers or may use a small memory space for storage of only one password. In addition, as illustrated by FIG. 3, a seven segment display which is often used in connection with video games or electronics devices may be used in place of the key matrix 1, in which case the input stage for an embodiment of the present invention may be constructed with a seven segment display 22 for displaying letters which are chosen by a user; letter converters 21 and 23 for changing the letter being displayed on the seven segment display 22; a selector 24 for selecting the letter being displayed on the seven segment; and a controller 25 for displaying on the seven segment display 22 letters chosen by the use of the letter converters 21 and 23.

The seven segment password input means above is used according to the present invention as follows. The micro-controller 11 (not shown) first determines whether a password hot key 5 has been entered. If found to have been entered, then the password stored in the memory 4 is transmitted to the computer based on the procedure outlined previously. If found not to have been entered, the micro-controller 11 checks the switch to determine if the direct transfer mode or the password input mode has been chosen. The password inputting performed previously by the key matrix 1 is performed by the seven segment password input means by entering the letter converters 21 and 23 for displaying desired letters on the seven segment display 22. The controller 25 actuates the display of the letters chosen by the letter converter 21 and 23. When a desired letter is displayed, the user may select it by entering the selector 24.

Once a selection is made, the selected letter is sent to the password signal director 2 which directs the received password signal from the seven segment password input means to the infrared transmitter 7 if the direct transfer mode has been selected. If the password input mode is has been selected the password signal received is sent to the memory selector 10, and the remaining procedure is the same as described previously.

Figure 4:
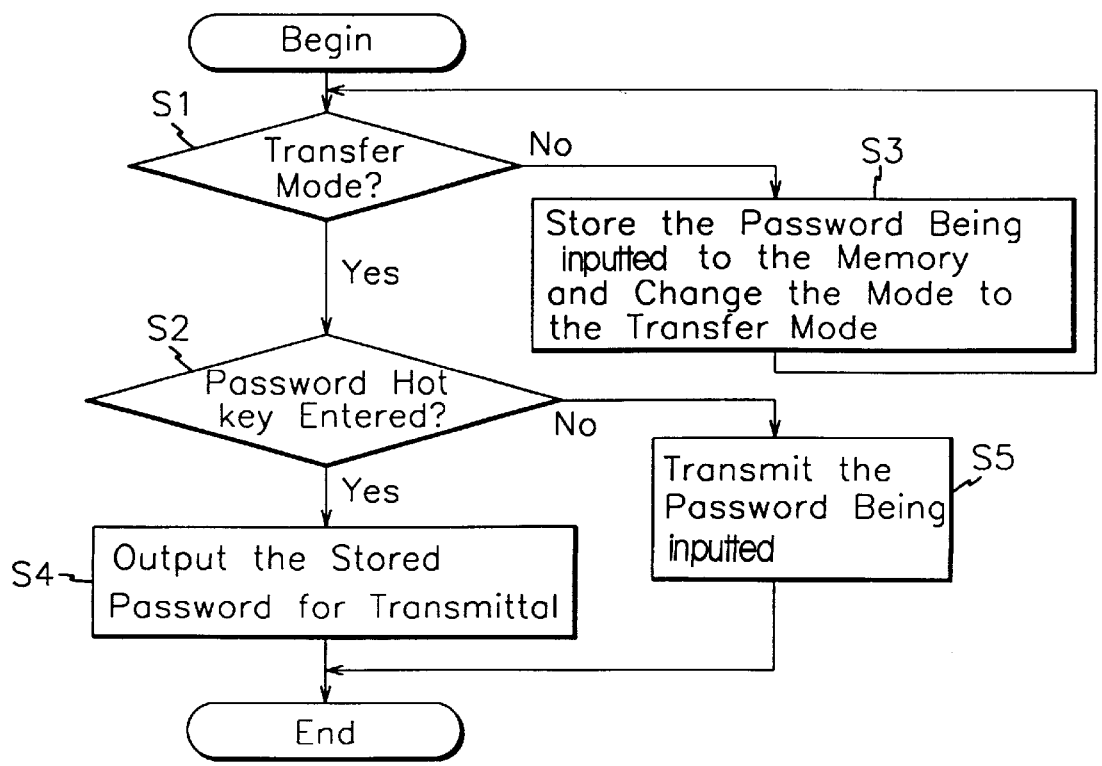
FIG. 4 is a flowchart of a control process for a remote infrared password key system practiced according to the principles of the present invention.

FIG. 4 shows another method for realizing objects of the present invention. When a computer is turned on, the micro-controller 11 checks if the computer is in a transfer mode (different from the direct transfer mode referred to previously) (S1). If in the transfer mode, it is then determined whether the password hot key 5 has been entered (S2). If it has been entered, the password signal previously stored in the memory 4 is outputted for transmittal to the computer (S4).

If the password hot key 5 has not been entered, a password being inputted by an input means, e.g., a key matrix 1, is directly transmitted for transmittal to the computer (S5). On the other hand, when a computer is turned on and if the micro-controller 11 determines that the computer is not in the transfer mode, i.e., in a storage mode (S1), a password being inputted by means of an input means is stored in the memory 4 (S3). The mode is then changed to the transfer mode and the program is returned to step 1 where microcontroller 11 again determnines if the computer is in the transfer mode. Thereafter, the program follows the same steps as described above. Note the mode is initially always in the transfer mode when the computer is turned on until the storage mode is specifically selected.

The present invention teaches a means of entering a password with a remote control, a means of conveniently entering a password by pressing a button by utilizing a password hot key which also eliminates the need to store the password, and a means of preventing unwanted disclosure of the password, by using a remote infrared password key system.

It should be understood that the present invention is not limited to the particular embodiment disclosed herein as the best mode contemplated for carrying out the present invention, but rather that the present invention is not limited to the specific embodiments described in this specification except as defined in the appended claims.

What is claimed is:

1. A remote infrared password key input system, comprising:

a switch selecting one of a direct transfer mode or a password input mode and for sending out a mode signal;

a controller receiving the mode signal from the switch and for sending out a mode change signal;

a key selector enabling entry of a password and outputting a password signal;

a password signal director receiving the mode change signal and the password signal, and directing the password signal for direct transmittal when the direct transfer mode has been selected by the switch and for indirect transmittal when the password input mode has been selected by the switch;

a memory storing the password signal outputted by the password signal director for indirect transmittal when the password input mode has been selected;

a password hot key outputting the password signal stored in the memory for transmittal; and a transmitter receiving one of the password signal outputted by the password hot key or the password signal directed for direct transmittal by the password signal director under the direct transfer mode and then transmitting the received password signal to the computer.

2. The remote infrared password key input system according to claim 1, further comprising a memory selector for receiving the password signal directed by the password signal director for indirect transmittal and for selecting memory space where the password signal is to be stored and for outputting the password signal.

3. The remote infrared password key input system according to claim 2, further comprising a password counter for receiving the password signal outputted by the memory selector and for counting the number of letters in the password signal and for outputting the password signal to the memory.

4. The remote infrared password key input system according to claim 3, said key selector comprising a key matrix having a plurality of letters.

5. The remote infrared password key input system according to claim 3, said key selector comprising:

a seven segment display for displaying letters which are chosen by a user;

a letter converter for changing the letter being displayed on the seven segment display;

a selector for selecting the letter being displayed on the seven segment display; and a controller for displaying on the seven segment display letters chosen by the letter converter.

6. The remote infrared password key input system according to claim 1, said key selector comprising a key matrix having a plurality of letters.

7. The remote infrared password key input system according to claim 1, said key selector comprising:

a seven segment display for displaying letters which are chosen by a user;

a letter converter for changing the letter being displayed on the seven segment display;

a selector for selecting the letter being displayed on the seven segment display; and a controller for displaying on the seven segment display letters chosen by the letter converter.

8. A remote infrared password key system control method, comprising the steps of:

determining whether a password hot key has been entered and outputting a stored password signal in a memory for transmittal to a computer if the password hot key has been entered;

determining whether a direct transfer mode has been selected if the password hot key has not been entered;

directly transmitting a password signal entered by an input means for transmittal to the computer if the direct transfer mode has been selected and the hot key has not been entered;

storing a password signal entered by an input means in a memory if both the direct transfer mode and the password hot key have not been entered; and transmitting the stored password signal for transmitting to the computer by entering the password hot key.

9. A remote infrared password key system control method, comprising the steps of:

determining whether a computer is in a transfer mode;

determining if a password hot key has been entered if the computer is in the transfer mode;

outputting a password signal previously stored in a memory for transmittal to the computer if the password hot key has been entered;

directly transmitting a password being inputted by an input means for transmittal to the computer if the password hot key has not been entered;

storing a password being inputted by an input means in a memory when the mode is not in the transfer mode; and changing the mode to the transfer mode after storing the password being inputted by an input means to a memory and returning to the transfer mode determining mode step.

\* \* \* \* \*